United States Patent
Li et al.

(10) Patent No.: US 9,169,149 B2
(45) Date of Patent: *Oct. 27, 2015

(54) VACUUM GLASS SEALING DEVICE

(75) Inventors: Yanbing Li, Henan (CN); Zhangsheng Wang, Henan (CN)

(73) Assignee: LUOYANG LANDGLASS TECHNOLOGY CO., LTD., Henan (CN)

( * ) Notice: Subject to any disclaimer, the term of this patent is extended or adjusted under 35 U.S.C. 154(b) by 275 days.

This patent is subject to a terminal disclaimer.

(21) Appl. No.: 13/988,939

(22) PCT Filed: Aug. 3, 2011

(86) PCT No.: PCT/CN2011/077946
§ 371 (c)(1),
(2), (4) Date: Jun. 21, 2013

(87) PCT Pub. No.: WO2012/068903
PCT Pub. Date: May 31, 2012

(65) Prior Publication Data
US 2014/0144186 A1    May 29, 2014

(30) Foreign Application Priority Data

Nov. 23, 2010 (CN) .......................... 2010 1 0555370

(51) Int. Cl.
*C03B 23/24* (2006.01)
*E06B 3/66* (2006.01)
*E06B 3/673* (2006.01)

(52) U.S. Cl.
CPC ............. *C03B 23/245* (2013.01); *E06B 3/6612* (2013.01); *E06B 3/67334* (2013.01); *E06B 2003/67395* (2013.01); *Y02B 80/24* (2013.01)

(58) Field of Classification Search
USPC ............................................... 65/154, 34, 36
See application file for complete search history.

(56) References Cited

U.S. PATENT DOCUMENTS

| | | | | |
|---|---|---|---|---|
| 2,714,785 A | * | 8/1955 | Roovers ........................... | 53/405 |
| 7,204,102 B1 | * | 4/2007 | Eames et al. ...................... | 65/36 |
| 2009/0151853 A1 | * | 6/2009 | Cooper .......................... | 156/104 |
| 2014/0048530 A1 | * | 2/2014 | Li et al. .......................... | 219/615 |
| 2014/0116092 A1 | * | 5/2014 | Zhao et al. ........................ | 65/34 |

FOREIGN PATENT DOCUMENTS

| | | |
|---|---|---|
| CN | 1286670 A | 3/2007 |
| CN | 101050056 A | 10/2007 |
| CN | 101148313 A | 3/2008 |
| WO | 03095388 A | 11/2003 |

\* cited by examiner

*Primary Examiner* — Mark Halpern
(74) *Attorney, Agent, or Firm* — AKC Patents, LLC; Aliki K. Collins

(57) ABSTRACT

The present invention discloses a vacuum glass sealing device. The device comprises an air extraction table, an upper pressing plate and a heating device, wherein the air extraction table is provided with an accommodating groove for placing glass plates to be sealed, the upper pressing plate is pressed on the glass plates to be sealed in the accommodating groove and air-tightly connected with the air extraction table around the periphery of the accommodating groove; and the air extraction table and/or the upper pressing plate are provided with air extraction ports, and the heating device heats the glass plates to be sealed from the exterior. The air extraction table and the upper pressing plate form a closed space in the sealing device, and the upper pressing plate is directly pressed on the glass plates to be sealed, so the volume of the closed space is greatly reduced, and conditions are created for quick vacuumizing of the closed space and quick sealing of the vacuum glass. The closed space in the sealing device is only used for providing a vacuum environment, and the heating device for welding is separately arranged at the exterior, so equipment operation is convenient, equipment construction is simplified, and a condition is created for large-scale processing of the vacuum glass.

10 Claims, 5 Drawing Sheets

VACUUM GLASS SEALING DEVICE

This application is a 371 of PCT/CN2011/077946 filed 3 Aug. 2011.

TECHNICAL FIELD

The present invention relates to a vacuum glass sealing device.

BACKGROUND ARTS

Vacuum glass compounded by using two or more glass plates has been absorbed more and more attention by people due to excellent sound insulation and heat insulation performances, so various vacuum glass manufacturing methods and corresponding vacuum glass products have been provided successively. The applicant has also invented a composite glass plate sealing technique and a vacuum glass product processed by using the technique through years of research and a large amount of experiments, and has applied to the China's State Intellectual Property Office for the patent. The periphery of the glass plates is air-tightly sealed by adopting a metal welding process in the composite glass plate sealing technique provided by the applicant; and before sealing, firstly, metal layers solidified together with the glass plates are preformed on the surface of the periphery of the glass plates, then the two or more glass plates are compounded, and the corresponding metal layers on the two adjacent glass plates are air-tightly sealed and connected by the metal welding process after compounding. During welding, the two metal layers can be mutually welded and connected directly, a metal sealing plate can also be arranged between the two metal layers, and air-tight sealing of the edges of the glass layers is realized by welding and connecting the metal sealing plate and the two metal layers. The structure of the vacuum glass is shown as a FIG. 1 and a FIG. 2, wherein the FIG. 1 shows that the two metal layers are directly welded and connected, and the FIG. 2 shows that the two metal layers are sealed through the metal sealing plate with U-shaped section.

For the composite glass plate sealing technique previously provided by the applicant, generally the two pieces of glass are sealed, then the compounded glass plates are vacuumized through a reserved air extraction port, and finally, the air extraction port is sealed. The manufacturing process is complex and needs complex manufacturing equipment, also brings certain uncertainty to the quality of a product, limits the processing efficiency of the vacuum glass and increases the manufacturing cost of the vacuum glass.

In addition, the vacuum glass can also be manufactured by using a vacuum chamber, namely the compounded glass plates are conveyed to the vacuum chamber, and vacuumizing and sealing operations of the vacuum glass are completed in the vacuum chamber. The glass plates for forming the vacuum glass and a middle support in the vacuum space are deformed under the stress of atmospheric pressure, and the deformation certainly causes that the vacuum space in the vacuum glass is reduced and the vacuum degree of the vacuum glass declines, so it is difficult to ensure the vacuum degree of the vacuum glass manufactured by using the vacuum chamber.

Invention Contents

With respect to the problems of the above existing technology, the present invention aims to provide a vacuum glass sealing device with simple structure, operation convenience, stable quality, high sealing efficiency and no air extraction port.

In order to fulfill the purposes, the vacuum glass sealing device comprises an air extraction table, an upper pressing plate and a heating device; the air extraction table is provided with an accommodating groove for placing glass plates to be sealed, the upper pressing plate is pressed on the glass plates to be sealed in the accommodating groove and air-tightly connected with the air extraction table around the periphery of the accommodating groove, and then the glass plates to be sealed are sealed in a closed space; and the air extraction table and/or the upper pressing plate are provided with air extraction ports, the air extraction ports are used for vacuumizing the closed space and the glass plates to be sealed in the closed space, and the heating device is used for heating the parts to be sealed on the glass plates to be sealed from the exterior of one side of the upper pressing plate and/or the exterior of one side of the air extraction table so as to complete metal welding of the parts to be sealed.

Further, the upper pressing plate is air-tightly connected with the air extraction table around the periphery of the accommodating groove through a sealing ring, and the sealing ring is arranged in a sealing ring installation groove on the air extraction table and/or the upper pressing plate.

Further, the heating device is an inductive heating device or a microwave heating device, and correspondingly, the upper pressing plate or the air extraction table positioned between the heating device and the glass plate to be sealed is made of nonmetallic material.

Further, the heating device is a laser heating device, and the upper pressing plate or the air extraction table positioned between the heating device and the glass plate to be sealed is made of transparent material.

Further, the heating device is arranged on an operating mechanism and carried by the operating mechanism to move along the parts to be sealed on the glass plates to be sealed so as to complete welding of the parts to be sealed on the periphery of the glass plates.

Further, the air extraction table is arranged on a known multi-degree-of-freedom movement mechanism and driven by the movement mechanism so that the parts to be sealed on the glass plates to be sealed move relative to the heating device so as to complete welding of the parts to be sealed.

Further, the sealing device also comprises a clamping device, and the upper pressing plate and the air extraction table are mutually fixed through the clamping device.

Further, the upper pressing plate is made of nonmetallic material, the heating device is an inductive heating device, and the heating device heats the parts to be sealed on the glass plates to be sealed from one side of the upper pressing plate; and the upper pressing plate is also provided with an annular pressing plate, the annular pressing plate is positioned on the periphery of the accommodating groove, the clamping device is a clamping flange, the clamping flange presses the upper pressing plate on the air extraction table through the annular pressing plate, and a plurality of clamping rings are arranged along the annular pressing plate.

Further, the air extraction table consists of a bottom plate and an annular surrounding plate, the lower end of the annular surrounding plate is situated on the bottom plate and sealed with the bottom plate through a sealing ring, the sealing ring is arranged in an installation groove at the bottom plate and/or the lower end of the annular surrounding plate, and the inner side of the annular surrounding plate and the upper surface of the bottom plate form the accommodating groove together; and the upper end of the annular surrounding plate is air-tightly connected with the upper pressing plate through a sealing ring, and the sealing ring is arranged in an installation groove at the upper pressing plate and/or the upper end of the annular surrounding plate.

Further, the air extraction port is formed on the air extraction table, a plurality of air extraction holes are arranged around the air extraction table at intervals, or a plurality of air extraction ports are arranged on the bottom plate of the air extraction table.

According to the vacuum glass sealing device of the present invention, the air extraction table and the upper pressing plate form a closed space in the sealing device, and the upper pressing plate is directly pressed on the glass plate to be sealed, so enough pre-pressing force is provided for the glass plates, the compound state of the glass plates before welding and the stability of positions in the accommodating grooves are ensured, smooth welding of the glass plates is ensured, the volume of the closed space is furthest reduced, and conditions are created for quick vacuumizing of the closed space and quick sealing of the vacuum glass.

Because the upper pressing plate in the sealing device of the present invention is pressed on the glass plate, the pressure of atmosphere is directly acted on the glass plate and the middle support through the upper pressing plate, compressive deformation of the glass plates for forming the vacuum glass and the middle support already happens at the same time of completing vacuumizing of the vacuum glass, and the sealed vacuum glass continuously generates very little compressive deformation after leaving the air extraction table, so vacuum glass products with high vacuum degree and stable vacuum degree can be processed by using the sealing device.

The closed space in the sealing device of the present invention is only used for providing a vacuum environment, and the heating device for welding is separately arranged at the exterior, so equipment operation is convenient, equipment construction is simplified, and a condition is created for large-scale processing of the vacuum glass.

DETAILED DESCRIPTION

Figure 4:
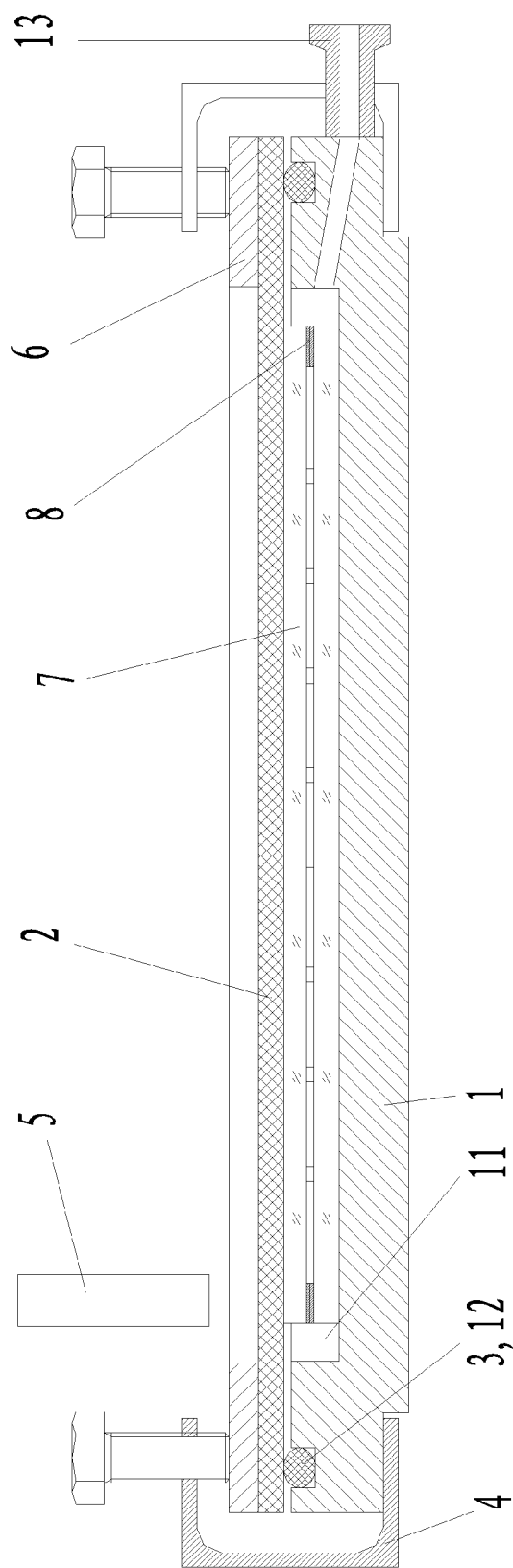
FIG. 4 is a structural schematic illustration of an embodiment 1 of the sealing device of the present invention.
Figure 5:
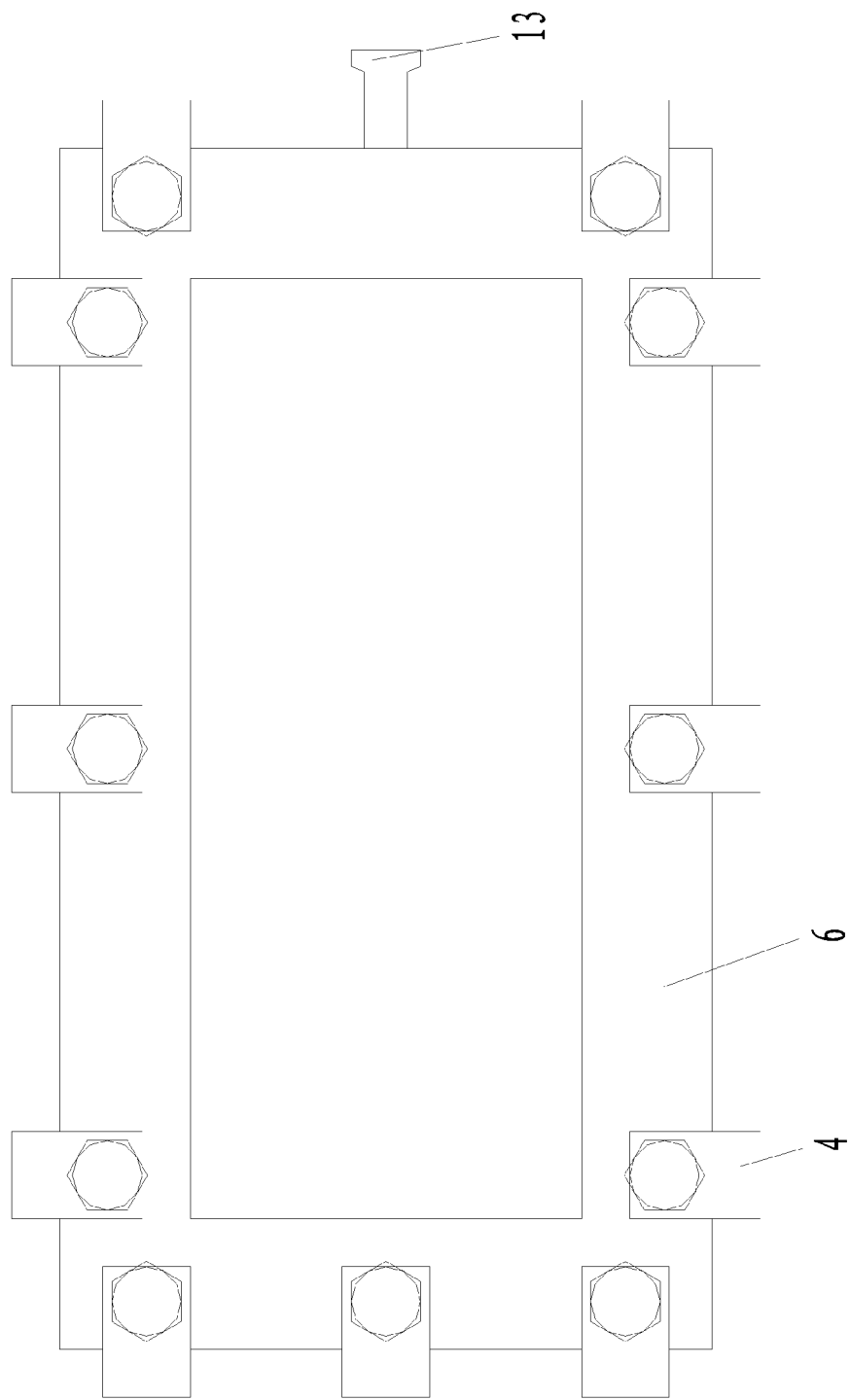
FIG. 5 is a top view of a FIG. 4.

Shown as the FIG. 4 and the FIG. 5, the sealing device of the present invention comprises an air extraction table 1, an upper pressing plate 2 and a heating device 5, wherein the air extraction table 1 is made of metal (or nonmetallic) material and provided with an accommodating groove 11, the air extraction table 1 around the periphery of the accommodating groove 11 is provided with an installation groove 12, a sealing ring 3 is arranged in the installation groove 12, and the side wall of the air extraction table 1 is provided with an air extraction port 13; the upper pressing plate 2 is made of fluorine rubber plate, a glass plate 8 to be sealed is placed in the accommodating groove 11, the upper pressing plate 2 is pressed on a glass plate 7 to be sealed, and the air extraction table 1 around the periphery of the accommodating groove 11 is sealed with the upper pressing plate 2 through the sealing ring 3 so as to seal the glass plate 7 to be sealed in a closed space; in order to ensure reliable air-tight connection between the upper pressing plate 2 and the air extraction table 1 during vacuumizing, the upper pressing plate 2 is also provided with an annular metal pressing plate 6 and a plurality of clamping flanges 4, each clamping flange 4 consists of a U-shaped clamping plate and a bolt, the plurality of clamping flanges 4 are arranged along the annular pressing plate 6, and the annular pressing plate 6 fixes the upper pressing plate 2 and the air extraction table 1 mutually and applies a pre-pressing force; and the heating device 5 is an inductive device, the heating device heats the part 8 to be sealed on the glass plate 7 to be sealed from the exterior of one side of the upper pressing plate 2, and metal layers preset on the two glass plates compounded together are welded together by a metal welding process so as to complete air-tight seal on the periphery of the glass plate 7 to be sealed.

Because the upper pressing plate 2 is made of nonmetallic material, when the upper pressing plate 2 is fixed directly by using the clamping flanges 4, the surface of the upper pressing plate 2 is easily damaged; and after the annular metal pressing plate 6 is arranged, the annular metal pressing plate 6 can protect the upper pressing plate 2 and uniformly distribute the force acted on the upper pressing plate 2 on the pressing surface so as to ensure the sealing effect of the sealing ring 3. Certainly, the upper pressing plate 2 and the annular metal plate 6 can also be made into a combined component, and the combined component not only plays a role in sealing, but also does not affect the welding.

The upper pressing plate 2 in the embodiment can also be made of transparent material such as a propene polymer (PP) plate, and the part to be sealed on the glass plate 7 to be sealed can be heated by adopting a laser device so as to complete welding of the metal layers on the two glass plates.

Besides the inductive heating device and the laser heating device, the heating device 5 can also be a microwave heating device.

Figure 1:
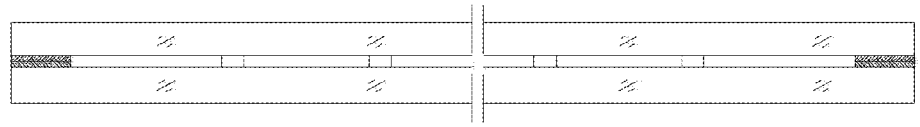
FIG. 1 is a structural schematic illustration 1 of conventional vacuum glass sealed by the sealing device of the present invention.
Figure 2:
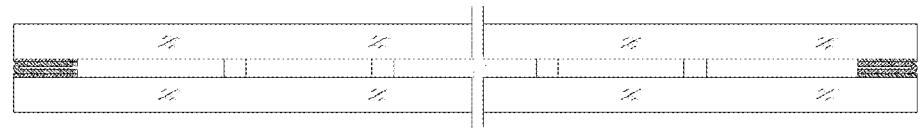
FIG. 2 is a structural schematic illustration 2 of conventional vacuum glass sealed by the sealing device of the present invention.
Figure 3:
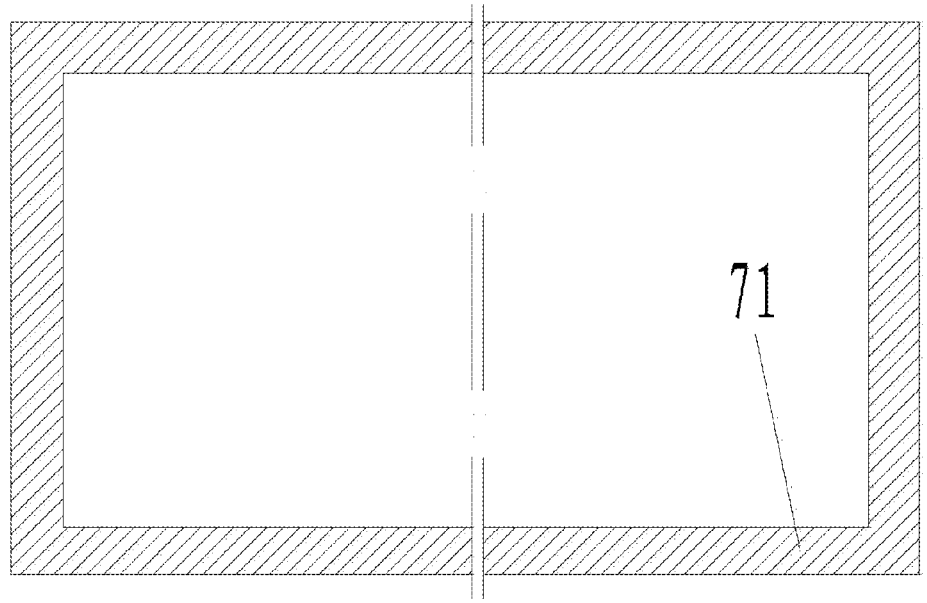
FIG. 3 is a schematic illustration of a glass plate, the edge surface of which is provided with a metal layer.

When the sealing device works, firstly, the two glass plates shown in the FIG. 3, the edge surfaces of which are provided with metal layers 71, are compounded (the metal layers 71 are fixedly connected together with the glass plates) together according to the state shown as the FIG. 1 or the FIG. 2, and a metal solder is placed between the metal layers 71 on the two glass plates or between the metal layer 71 and a U-shaped metal sealing plate; then, the two compounded glass plates are put into the accommodating groove 11 on the air extraction table 1, the upper pressing plate 2 is covered, and because the compounded glass plates are higher than the depth of the accommodating groove 11, the upper pressing plate 2 can be ensured to be reliably pressed on the glass plates to be sealed, and the height of the glass plates exceeding the accommodating groove 11 cannot affect reliable seal of the sealing ring 3 on the upper pressing plate 2 and the air extraction table 1; and finally, the closed space on the inner side of the sealing ring 3 is vacuumized by using an external vacuum pump through the air extraction port 13, the heating device 5 is started to heat the part 8 to be sealed on the glass plate 7 to be sealed after the predetermined vacuum degree is achieved so as to complete welding of the metal layers on the two glass plates.

The heating area of the heating device 5 is small, then the heating device 5 is arranged on a known multi-degree-of-freedom movement mechanism (not shown in the figures), and the multi-degree-of-freedom movement mechanism carries the heating device 5 to move along the part to be sealed on the glass plate to be sealed to gradually complete welding of the part to be sealed, so that the welding quality can be ensured, and the working strength of operators can also be lightened.

Figure 6:
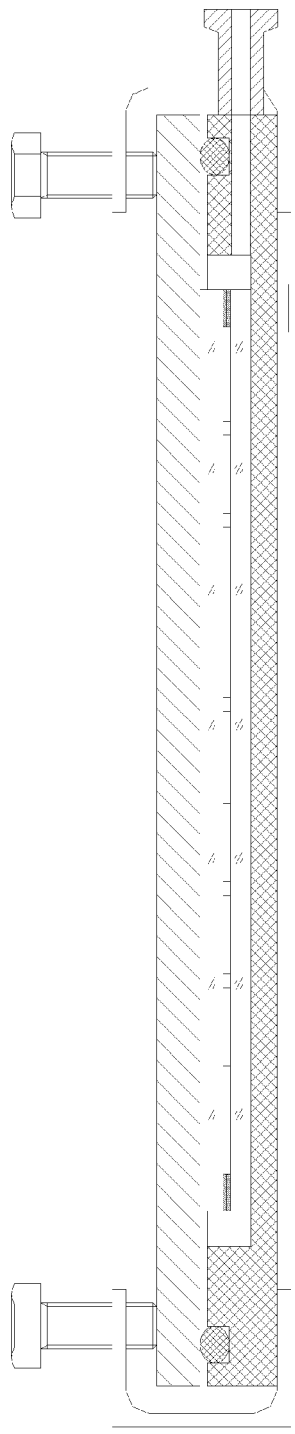
FIG. 6 is a structural schematic illustration of an embodiment 2 of the sealing device of the present invention.

The heating device 5 in the embodiment 1 heats the glass plate 7 to be sealed from the exterior of one side of the upper pressing plate 2; and when the air extraction table 1 is made of nonmetal material and the upper pressing plate 2 is made of metal material shown as the FIG. 6, the heating device 5 can heat the glass plate 7 to be sealed from the exterior of one side of the air extraction table 1.

Figure 7:
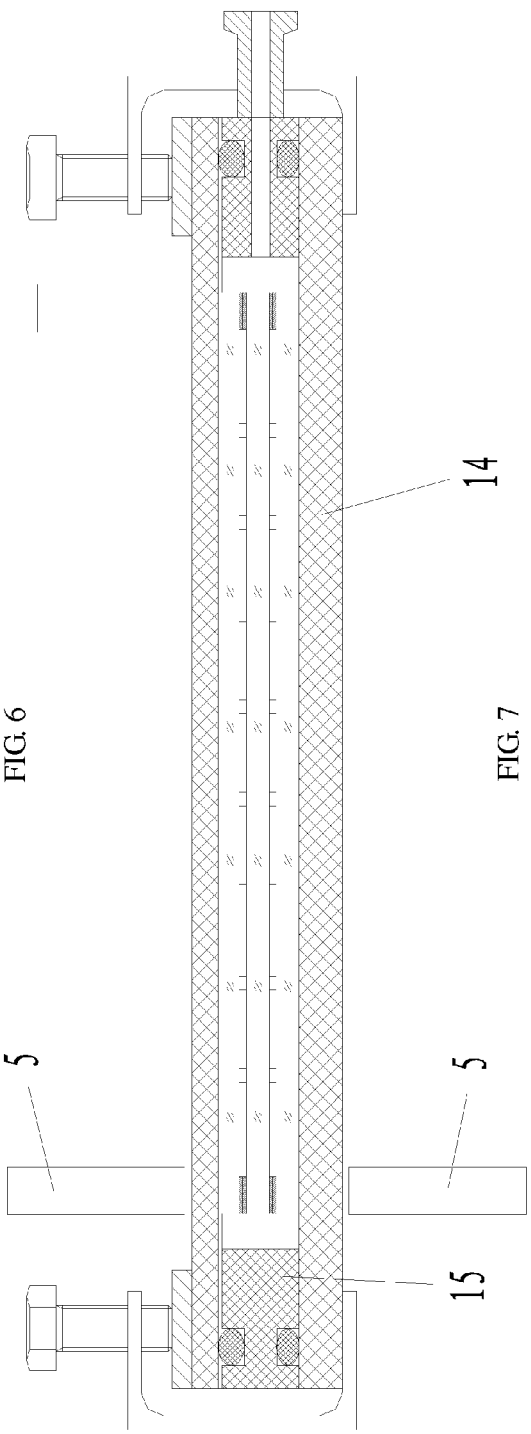
FIG. 7 is a structural schematic illustration of an embodiment 3 of the sealing device of the present invention.

In the embodiment 3 shown as the FIG. 7, the air extraction table 1 consists of a bottom plate 14 and an annular surrounding plate 15, the lower end of the annular surrounding plate 15 is situated on the bottom plate 14 and sealed with the bottom plate 14 through a sealing ring, the sealing ring is arranged in an installation groove at the lower end of the annular surrounding plate 15, and the inner side of the annular surrounding plate 15 and the upper surface of the bottom plate 14 form an accommodating groove together; and the upper end of the annular surrounding plate 15 is air-tightly connected with the upper pressing plate 2 through a sealing ring, and the sealing ring is arranged in an installation groove at the upper end of the annular surrounding plate 15.

Because both the upper pressing plate 2 and the air extraction table 1 are made of nonmetallic materials, the parts to be sealed on the glass plates to be sealed can be heated by adopting two heating devices 5; and particularly when the processed vacuum glass consists of three glass plates, the parts to be sealed on the glass plates are heated by adopting the two heating devices 5 from two sides of the glass plates, so that welding of two layers of sealed parts can be completed at the same time, and the production efficiency of the vacuum glass is improved.

In the above three embodiments, the glass plate 7 to be sealed is directly placed on the bottom surface of the accommodating groove 11; when the height of the compounded glass plate 7 to be sealed is less than the depth of the accommodating groove 11, a cushion layer or a cushion block with proper thickness can be arranged at the bottom of the accommodating groove 11, so that the upper surface of the glass plate of the upper layer is higher than the accommodating groove 11 to ensure that the upper pressing plate 2 is reliably pressed on the glass plates. Or, under the condition that normal heating of the heating device 5 is not affected, the upper pressing plate 2 is provided with a protruding plane which can be inserted into the accommodating groove 11.

The clamping flanges 4 in the embodiments can only be one kind of numerous clamping devices; taking the embodiment 1 as an example, in order to mutually fix the upper pressing plate and the air extraction table, a quick buckle can also be adopted, or the annular pressing plate, the upper pressing plate and the air extraction table are provided with corresponding through holes and fixed one another by using bolts; and even under the condition that the edge part of the upper pressing plate has enough weight and intensity, the purpose of pre-sealing can also be fulfilled without using any clamping device.

Figure 8:
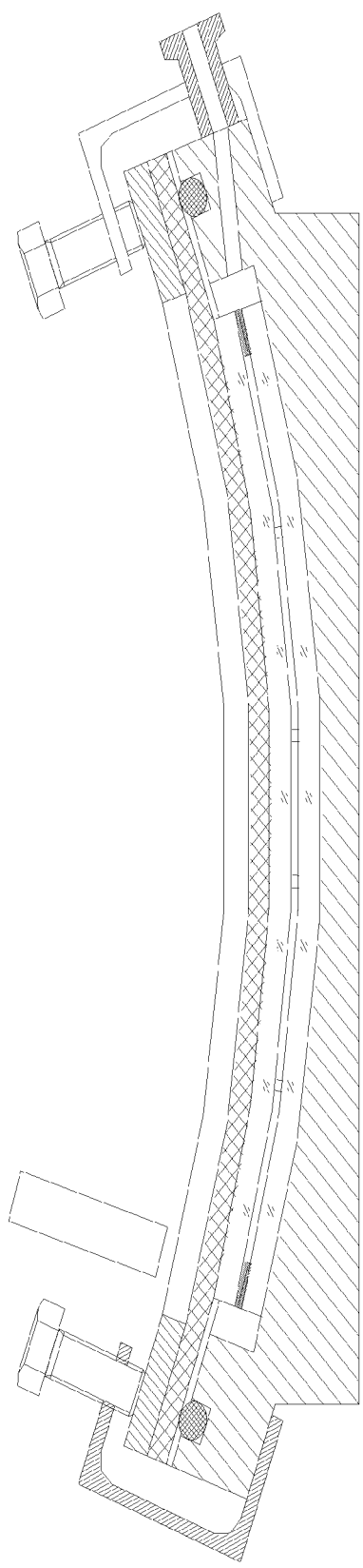
FIG. 8 is a structural schematic illustration of an embodiment 4 of the sealing device of the present invention.

The above three embodiments are all used for manufacturing a planar vacuum glass product, and the sealing device of the present invention can also be used for processing a curved vacuum glass product, as shown in the FIG. 8.

When the device is used for manufacturing a vacuum glass product, the upper pressing plate can adapt to the glass surface of random shape, and uniformity and consistency of the pre-pressing forces of the upper and lower glass plates can be ensured through the pressure of atmosphere, so for the sealing of the glass product with complex surface shape, the sealing quality can be reliably ensured.

Generally, when the curved vacuum glass product is sealed, the optimal acting direction of the heating device such as a high-frequency welding head, a microwave generator, a laser emission head or the like should be the normal direction of the glass surface at the sealed part, so the heating devices need to be driven by the multi-degree-of-freedom movement mechanism.

The above examples are only used for explaining the present invention, the embodiments of the present invention are not limited in the examples, and various specific embodiments made by those skilled in the field and according with the concept of the present invention are within the protection range of the present invention.

The invention claimed is:

1. A vacuum glass sealing device characterized by comprising an air extraction table, an upper pressing plate and a heating device, wherein the air extraction table is provided with an accommodating groove for placing glass plates to be sealed, the upper pressing plate is pressed on the glass plates to be sealed in the accommodating groove and air-tightly connected with the air extraction table around the periphery of the accommodating groove, and then the glass plates to be sealed are sealed in a closed space; and the air extraction table and/or the upper pressing plate are provided with air extraction ports, the air extraction ports are used for vacuumizing the closed space and the glass plates to be sealed in the closed space, and the heating device is used for heating the parts to be sealed on the glass plates to be sealed from the exterior of one side of the upper pressing plate and/or the exterior of one side of the air extraction table so as to complete metal welding of the parts to be sealed.

2. The sealing device according to claim 1 characterized in that: the upper pressing plate is air-tightly connected with the air extraction table around the periphery of the accommodating groove through a sealing ring, and the sealing ring is arranged in a sealing ring installation groove on the air extraction table and/or the upper pressing plate.

3. The sealing device according to claim 1 characterized in that: the heating device is an inductive heating device or a microwave heating device, and correspondingly, the upper pressing plate or the air extraction table positioned between the heating device and the glass plate to be sealed is made of nonmetallic material.

4. The sealing device according to claim 1 characterized in that: the heating device is a laser heating device, and the upper pressing plate or the air extraction table positioned between the heating device and the glass plate to be sealed is made of transparent material.

5. The sealing device according to claim 1 characterized in that: the heating device is arranged on an operating mechanism and carried by the operating mechanism to move along the parts to be sealed on the glass plates to be sealed so as to complete welding of the parts to be sealed on the periphery of the glass plates.

6. The sealing device according to claim 1 characterized in that: the air extraction table is arranged on a known multi-degree-of-freedom movement mechanism and driven by the movement mechanism so that the parts to be sealed on the glass plates to be sealed move relative to the heating device so as to complete welding of the parts to be sealed.

7. The sealing device according to claim 1 characterized in that: the sealing device also comprises a clamping device, and the upper pressing plate and the air extraction table are mutually fixed through the clamping device.

8. The sealing device according to claim 6 characterized in that: the upper pressing plate is made of nonmetallic material, the heating device is an inductive heating device, and the heating device heats the parts to be sealed on the glass plates to be sealed from one side of the upper pressing plate; and the upper pressing plate is also provided with an annular pressing plate, the annular pressing plate is positioned on the periphery of the accommodating groove, the clamping device is a clamping flange, the clamping flange presses the upper pressing plate on the air extraction table through the annular pressing plate, and a plurality of clamping rings are arranged along the annular pressing plate.

9. The sealing device according to claim 1 characterized in that: the air extraction table consists of a bottom plate and an annular surrounding plate, the lower end of the annular surrounding plate is situated on the bottom plate and sealed with the bottom plate through a sealing ring, the sealing ring is arranged in an installation groove at the bottom plate and/or the lower end of the annular surrounding plate, and the inner side of the annular surrounding plate and the upper surface of the bottom plate form the accommodating groove together; and the upper end of the annular surrounding plate is airtightly connected with the upper pressing plate through a sealing ring, and the sealing ring is arranged in an installation groove at the upper pressing plate and/or the upper end of the annular surrounding plate.

10. The sealing device according to claim 9 characterized in that: the air extraction port is formed on the air extraction table, a plurality of air extraction holes are arranged around the air extraction table at intervals, or a plurality of air extraction ports are arranged on the bottom plate of the air extraction table.

* * * * *